UNITED STATES PATENT OFFICE.

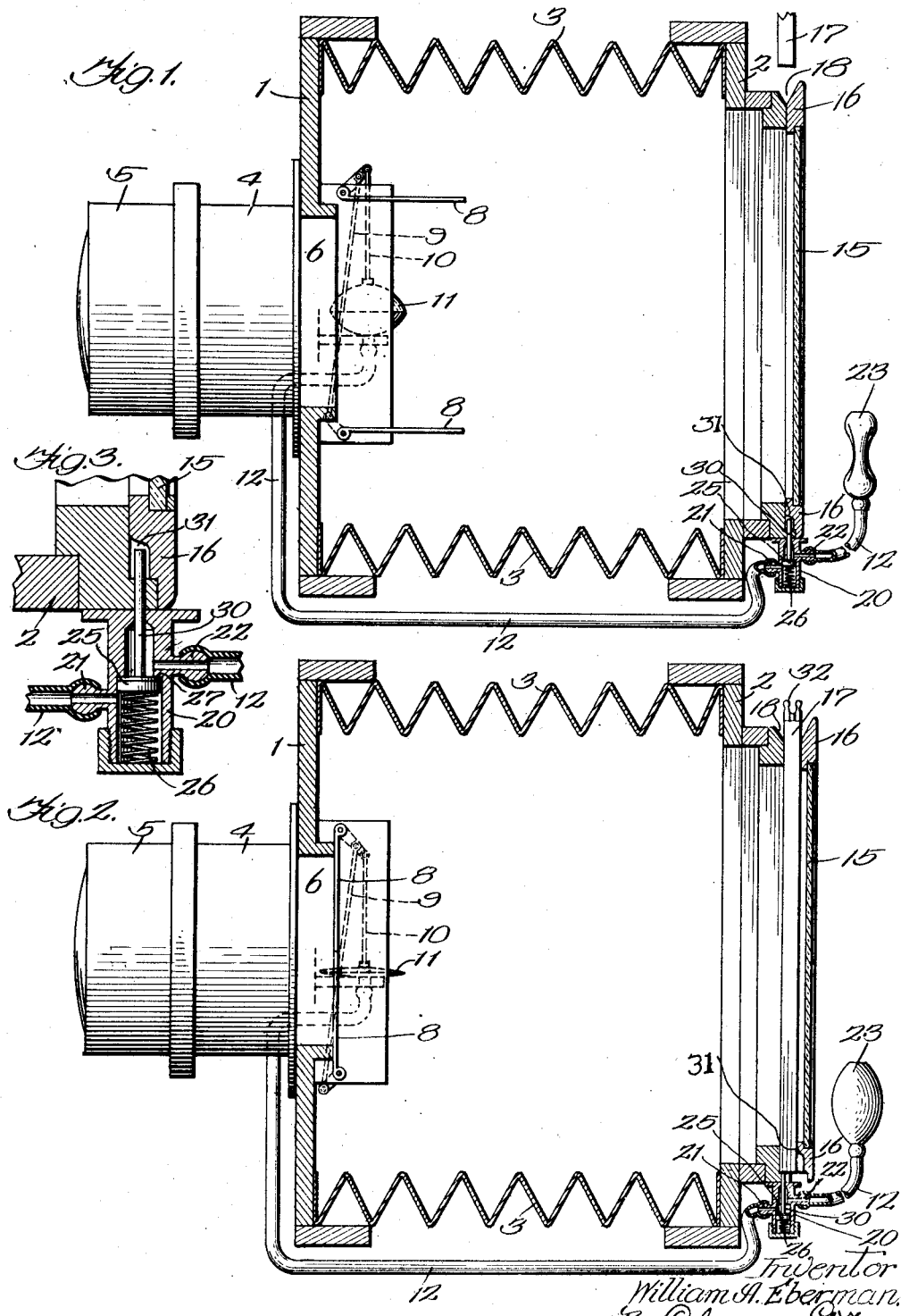

WILLIAM A. EBERMAN, OF CHICAGO, ILLINOIS, ASSIGNOR OF ONE-HALF TO WILFRED E. SMITH, OF CHICAGO, ILLINOIS.

CAMERA.

1,361,031.   Specification of Letters Patent.   Patented Dec. 7, 1920.

Application filed March 21, 1919. Serial No. 284,166.

*To all whom it may concern:*

Be it known that I, WILLIAM A. EBERMAN, a citizen of the United States, residing at Chicago, in the county of Cook and State of Illinois, have invented a certain new and useful Improvement in Cameras, of which the following is a specification.

My invention relates to cameras of the type having removable plate holders, such cameras being employed, for example, by professional photographers for portrait and similar work. In this type of camera the shutter is usually air controlled, the motive air being conveyed to the shutter operating mechanism through a long rubber tube ending in a bulb which the operator presses when he wishes the shutter to open. In taking a portrait, or any other work where careful posing and focusing are required, the usual mode of operation is as follows:—

The operator places the sitter in position and then proceeds to position and focus the camera. This is done while the plate holder is absent and to accomplish it the operator first presses upon the bulb and opens the shutter so that the image of the sitter may be thrown on the ground glass at the back of the camera. The positioning and focusing of the camera properly requires both hands of the operator, and in order that both hands may be free, the operator, after pressing the bulb and thereby opening the shutter causes the shutter to remain open by passing a pinch clip over the rubber tube, thus preventing the reverse flow of air in the tube. The operator then inserts the plate holder and removes the clip so that the shutter will close before the slide which covers the sensitized plate in the holder is withdrawn from the plate holder. It is highly desirable, especially in taking portraits of children, for the operator to work as rapidly as possible after the camera has been focused; otherwise the sitter is apt to become restless and alter his position. It is also desirable that as little noise as possible should be made, as clicks or other unaccustomed sounds are apt to disconcert the sitter and produce an unnatural expression. One thing that takes time after the camera has been focused is the need for the operator to reach down to the rubber tube and unfasten the pinch clip. This operation also has the disadvantage that when the clip is removed, unless the operator takes the added precaution of grasping the bulb and letting it inflate slowly (which process also takes time) the shutter closes with a distinct clicking noise with the result mentioned. Another disadvantage is that an inexperienced operator occasionally forgets to remove the clip before he removes the slide, thus ruining the plate. The object of my invention is to provide a camera so constructed as to eliminate these disadvantages.

In carrying out my invention I place valve mechanism in the duct which conveys the motive air to and from the shutter-operating mechanism. This valve mechanism is so constructed that when the operator presses the bulb, the shutter will open, but as soon as he releases the bulb the valve will act as a check and prevent the motive air from reversing its flow and the shutter from closing. In other words the valve mechanism automatically holds the shutter open. This relieves the operator of the necessity of reaching for the pinch clip and holding the bulb compressed with one hand while he applies the clip to the tube with the other. But in addition to this, I place the valve mechanism in such position that the plate holder itself, as it is being inserted into the camera, releases the valve. The construction is such that by the time the plate holder is in position the shutter will be closed. The result is that not only time is saved, but the clicking noise which occurs when the shutter closes occurs simultaneously with the noise made by the plate holder in being pushed "home" in the camera, and hence is merged with it. The noise may be slightly augmented but it is not disconcerting because it occurs during an act which the sitter can plainly observe and which he readily understands. Another advantage is that it avoids the danger that the operator in his haste or inexperience may forget to close the shutter before he withdraws the slide.

I obtain my objects by the mechanism illustrated in the accompanying drawings in which—

Figure 1 is a vertical sectional elevation of a camera embodying my invention. The shutter is shown in open position and the check valve is shown in acting position, holding the shutter open.

Fig. 2 is similar to Fig. 1, except that it shows the shutter closed and the check valve in non-acting position.

Fig. 3 is a sectional elevation showing in detail the construction of the valve mechanism and associated parts.

Like numerals denote like parts throughout the several views.

The body of the camera has a front 1 and a back 2 connected by a bellows 3. Mounted on the front is a tube 4 which supports the lens holder 5. The front opening 6 which registers with tube 4 is controlled by a self closing shutter of ordinary air controlled type. This shutter has two wings 8, 8 which are pivoted to the front of the camera. They are connected by a link 9 so as to move in unison and are actuated by a rod 10 actuated by an expansible air chamber 11. Motive air for controlling the shutter is led to the chamber 11 through a duct 12. At the back of the camera a ground glass 15 is mounted in a frame 16 which is spring pressed toward the back 2. The parts are beveled so as to form a V-shaped groove at the point 18, and when the plate holder is forced down into it, the frame of the ground glass is forced backward and the plate holder takes its place.

All of the parts thus far referred to by reference numeral are of standard camera construction, and will be readily understood by those accustomed to the manufacture and use of portrait taking cameras. As usual in cameras of this type, the frame of the ground glass and the back of the camera, taken together form a guide for the plate holder.

Now, referring more particularly to the novel elements, a valve casing 20 is secured to the bottom of the camera, at the back thereof. It divides the air duct 12 into two parts, one part being secured to the nipple 21 which is hollow and constitutes an exhaust port. This part of the air duct leads to the air chamber 11. The other part of duct 12 connects with the nipple 22 which is hollow and forms the inlet port of the valve casing. The opposite end of the last mentioned section of the air duct terminates in a resilient compressible bulb 23. The valve casing incloses a valve 25 which is normally held by a spring 26 in engagement with an annular shoulder 27 formed on the inside of the casing midway between ports 21 and 22. When in normal position, as shown in Fig. 3, the valve will confine in duct 12 an air chamber 11 such air as may be contained therein, and thus hold the shutter open. But if the bulb is inflated and the operator then presses upon it, the compressed air which is thereby produced enters the valve casing from the inlet port 22, above the valve, and forces the valve down until it uncovers the port 21 and permits the compressed air to flow forward into the air chamber 11 and open the shutter.

I have now described the mechanism by which when the operator presses the bulb the shutter will open and the valve mechanism will hold it open. The valve might be hand releasable, but according to my invention I arrange to take advantage of the arrival of the plate holder to automatically release the valve and thus relieve the operator of the necessity of performing the act consciously. As shown in the drawings, the valve casing 20 is placed in line with the plane which the plate holder will occupy when in position in the camera. A stem 30 is fastened to the valve and passes up through suitable apertures into the path of the descending plate holder. The proportions are such that when the plate holder has fully descended it will hold the valve down far enough to uncover the port 21. This will afford a free passage through the casing from the port 21 to the port 22 so that the air from the collapsible chamber 11 may escape back into the bulb 23. In order that the frame 16 which holds the ground glass will not interfere with the upper end of the valve stem when the latter is in uppermost position, I form a chamber 31 at the bottom of the frame, as shown in detail in Fig. 3.

The operation will now be readily understood. When the operator is ready to position the camera and adjust the focus, he presses bulb 23. The expressed air presses down on valve 25, forcing a passage past it out through port 21 and into the air chamber 11 thus causing the shutter to open. As soon as the operator starts to release the pressure on bulb 23 the check valve rises above port 21, thus confining the air in the chamber 11 and lower portion of the casing 20 and connecting part of duct 12. Consequently the shutter stays open and will remain open until the check valve is released. The operator now attends to the placing of the camera and the focusing of the lens. When this is accomplished he introduces the plate holder 17 by lowering it into the groove 18 and forcing it downward to a position in front of the ground glass 15.

As the plate holder is about to reach its lowermost position it engages the upstanding projecting end of the valve stem, the final part of the downward movement of the plate holder lowering the valve far enough to uncover the port 21 and permit the air to flow in the reverse direction from chamber 11 through valve casing 20 and back into bulb 23. Thus by the time the plate holder is pushed home in the camera the shutter will be closed and the slide 32 may be withdrawn from the plate holder without harm. When the operator is ready to make the exposure, all he has to do is to press the bulb, re-insert the slide 32 into the plate holder and withdraw the plate holder, whereupon the valve is automatically permitted to rise to normal checking position, and the apparatus is ready for a repetition of the process. It will be noted that when the plate holder is in position in the camera, as it will be when the exposure is to be made, the valve will be held down by the plate holder and hence the force of the spring does not have to be overcome by the air pressure created by the operator by pressing the bulb. Consequently, during that part of the operation when the operator has most need of accurate control over the shutter, the action will be just as sensitive as it would be if my automatic mechanism were absent. In other words, my mechanism does not add any burden to the action of the mechanism at the time when it is important that the sensitiveness of the apparatus be preserved. In practice, the spring 26 is made of light material and the added pressure which the operator has to exert to lower the valve is very slight in any event, but as I have constructed the mechanism, at the most critical time of the operation of the apparatus the action is just as sensitive and delicate as if my special elements of the combination were totally absent.

The mechanism has the added advantage, heretofore mentioned, that the operator is relieved of the need of remembering to perform any conscious act, (e. g., to close the shutter) before withdrawing the slide from the plate holder. To withdraw the slide before the shutter were closed would, of course, under ordinary circumstances ruin the plate; but with my mechanism the operator need not think about the shutter, for the shutter will be automatically closed before the plate holder is completely inserted.

It will be understood that the valve and valve casing do not necessarily come at the bottom of the camera. Usually the backs of cameras are reversible in the sense that they may be placed so that the plate holder is pushed in from the side or from the top. Therefore, when I say, as above, that the valve and valve casing are located at the bottom of the camera, it is only for the purpose of explaining the principle of operation, for they may come either at the bottor or at the side of the camera, depending upon the position occupied by the camera at the time.

Having thus described my invention what I claim as new and desire to secure by Letters Patent, is:—

1. In a camera having a guide for the plate holder, a pneumatically operated shutter biased toward closed position, and a check valve for holding the shutter in open position, said check valve being adapted to be directly operated by the plate holder and to be moved by it to nonacting position as the plate holder moves in its guide toward acting position.

2. A camera having a plate holder, an air controlled shutter, an air duct for conveying the motive air, a check valve in said duct, said valve, when in acting position being adapted to hold the shutter open, said valve being adapted to be held in non-acting position by the plate holder when the latter is in acting position in its guide.

3. A camera having a plate holder, an air controlled shutter, an air duct for conveying the motive air, a valve casing having an inlet and an outlet port communicating with the interior of different parts of the duct, and an air controlling valve in said casing adapted to be controlled by the plate holder when the latter is within the plate holder guide.

4. A camera having an air controlled shutter, a valve for controlling the flow of motive air, a valve casing having an outlet port communicating with the shutter mechanism, and an inlet port communicating with the source of motive air, said valve, in one position, permitting the air to flow from the inlet port to the outlet port, and in another position being adapted to check the return flow in the outlet port to thereby hold the shutter open, said valve being biased toward the last mentioned position, and mechanically operated means for holding the valve in the first mentioned position.

5. A camera having an air controlled shutter, an air duct for conveying the motive air to and from the shutter, a valve casing having an inlet port and an outlet port communicating with the interior of different parts of the air duct, said valve being adapted in one position to permit the air to flow from the inlet port to the outlet port and in another position to hold the air in the outlet port for keeping the shutter open, said valve being biased toward the last mentioned position, said valve having a stem projecting through the valve casing, whereby the valve may be moved away from the last mentioned position and thereby permit the shutter to close.

6. A camera having a plate holder, a plate holder guide, an air controlled shutter, an air duct for conveying the motive air to and from the shutter, a valve casing having an inlet port and an outlet port communicating with the interior of different parts of the air duct, said valve being adapted in one position to permit the air to flow from the inlet port to the outlet port and in another position to hold the air in the outlet port for keeping the shutter open, said valve being biased toward the last mentioned position, said valve having a stem projecting through the valve casing, into the path of the plate holder whereby the plate holder, as it reaches acting position, may move the valve away from the last mentioned position to thereby permit the shutter to close.

7. A camera having a guide for the plate holder, a self closing shutter, air actuated means for opening said shutter, and a check valve and casing for confining the air in the air actuated means to hold the shutter open, said check valve being adapted to be moved to non-checking position by the plate holder as the latter reaches home position in the plate holder guide.

8. A camera having a guide for the plate holder, a self-closing shutter, air actuated means for opening said shutter, a check valve and casing for confining the air in the air actuated means to hold the shutter open, and a stem on the check valve projecting into the plate holder guide whereby the plate holder in reaching home position in the guide engages said stem and forces the valve to non-checking position.

9. A camera having a guide for the plate holder, an air controlled, self closing shutter, a self closing check valve for the motive air for holding the shutter open, a casing for said valve, and a stem attached to said valve and projecting through the valve casing to afford means whereby the valve may be held in open, non-acting position.

In witness whereof I have hereunto subscribed my name.

WILLIAM A. EBERMAN.